(12) United States Patent
Grether et al.

(10) Patent No.: US 9,310,004 B2
(45) Date of Patent: Apr. 12, 2016

(54) WATER OUTLET FITTING WITH A BALL-AND-SOCKET JOINT

(75) Inventors: Hermann Grether, Mullheim (DE); Christoph Weis, Mullheim (DE); Holger Reinhardt, March/Buchheim (DE)

(73) Assignee: NEOPERL GMBH, Mullheim (DE)

( * ) Notice: Subject to any disclaimer, the term of this patent is extended or adjusted under 35 U.S.C. 154(b) by 330 days.

(21) Appl. No.: 13/805,110

(22) PCT Filed: Jun. 17, 2011

(86) PCT No.: PCT/EP2011/003009
§ 371 (c)(1),
(2), (4) Date: Dec. 18, 2012

(87) PCT Pub. No.: WO2011/157441
PCT Pub. Date: Dec. 22, 2011

(65) Prior Publication Data
US 2013/0088007 A1     Apr. 11, 2013

Related U.S. Application Data

(63) Continuation-in-part of application No. 12/818,666, filed on Jun. 18, 2010, and a continuation-in-part of application No. 13/047,107, filed on Mar. 14, 2011, now Pat. No. 8,746,596.

(30) Foreign Application Priority Data

Mar. 3, 2011   (DE) ............ 20 2011 003 476 U

(51) Int. Cl.
*F16L 27/04*   (2006.01)
*E03C 1/04*    (2006.01)
(Continued)

(52) U.S. Cl.
CPC .  *F16L 27/04* (2013.01); *B05B 1/18* (2013.01); *B05B 15/065* (2013.01);
(Continued)

(58) Field of Classification Search
USPC ................ 285/261, 270–271, 146.1–146.3, 285/263–264
See application file for complete search history.

(56) References Cited

U.S. PATENT DOCUMENTS 2,369,849 A * 2/1945 Phillips ............... F16L 59/16
                                              174/21 JC
3,165,338 A    1/1965 Moss
(Continued)

FOREIGN PATENT DOCUMENTS

DE       3133267 A1   3/1983
DE    202006010072 U1   9/2006
(Continued)

OTHER PUBLICATIONS

Non-Final Office Action issued by the USPTO in U.S. Appl. No. 12/818,666 on May 5, 2015.

*Primary Examiner* — Aaron Dunwoody
*Assistant Examiner* — Fannie Kee
(74) *Attorney, Agent, or Firm* — Volpe and Koenig, P.C.

(57) ABSTRACT

A water outlet fitting with a handleable water outlet (4) and with a flexible hose line (3) which can be connected to the water outlet (4) via a coupling (5). A characteristic feature of the water outlet fitting according to the invention is that the coupling (5), which is provided for connecting the water outlet (4) and hose line (3), has a ball-and-socket joint (7). The ball-and-socket joint (7) connected between the water outlet (4) and the hose line (3) not only increases the mobility and articulation between the water outlet (4) and the flexible hose line (3), but the ball-and-socket joint (7) also permits the water outlet (4) to be rotated relative to the hose line (3) without having to be concerned that the screw connection or similar coupling (5) provided between the water outlet (4) and hose line (3) will become undone.

8 Claims, 3 Drawing Sheets

(51) Int. Cl.
*F16L 37/088* (2006.01)
*B05B 15/06* (2006.01)
*B05B 1/18* (2006.01)
*F16L 27/08* (2006.01)
*E03C 1/02* (2006.01)
*E03C 1/08* (2006.01)
*F16L 33/20* (2006.01)

(52) U.S. Cl.
CPC ............ *B05B 15/066* (2013.01); *B05B 15/067* (2013.01); *E03C 1/021* (2013.01); *E03C 1/04* (2013.01); *E03C 1/0401* (2013.01); *E03C 1/0404* (2013.01); *F16L 27/0861* (2013.01); *F16L 37/088* (2013.01); *E03C 2001/0415* (2013.01); *E03C 2001/082* (2013.01); *F16L 33/20* (2013.01)

(56) References Cited

U.S. PATENT DOCUMENTS

| 4,431,031 | A | 2/1984 | Ettlinger |
| 5,865,378 | A * | 2/1999 | Hollinshead et al. ...... 239/587.1 |
| 6,846,022 | B2 * | 1/2005 | Takagi ................. F16L 27/023 285/146.1 |
| 7,712,793 | B1 * | 5/2010 | Garraffa ................. F16L 27/06 285/148.15 |
| 2005/0156062 | A1 | 7/2005 | Thomas et al. |

FOREIGN PATENT DOCUMENTS

| EP | 0441686 A1 | 8/1991 |
| WO | 2004/007854 A1 | 1/2004 |
| WO | 2007/090311 A2 | 8/2007 |
| WO | 2008/067879 A1 | 6/2008 |

* cited by examiner

WATER OUTLET FITTING WITH A BALL-AND-SOCKET JOINT

BACKGROUND

The invention relates to a water outlet fitting with a handleable water outlet and with a flexible hose line which is connectable to the water outlet via a coupling, which coupling has a ball-and-socket joint which has a first and a second joint part which are connected to each other in an articulated manner and have interconnected liquid passages and of which one joint part bears a hose nipple and an internal or external thread is provided on the other joint part.

Various water outlet fittings with a handleable water outlet are already previously known. This water outlet may be configured, for example, as a handheld spray attachment or similar flexibly handleable water outlet.

Various embodiments of handheld spray attachments which can be used as shower spray attachments or as kitchen spray attachments are already known. The previously known handheld spray attachments are generally connected via a screw coupling to a flexible hose line which, for its part, is connected to the water mains. The previously known handheld spray attachment usually has a spray attachment handle which bears an external thread at the end region thereof which faces away from a spray attachment head and end region designed as a hose connection. The hose line is provided with a hose connection counterpart which can be firmly screwed by means of a union nut bearing an internal thread to the external thread of the hose connection provided on the handheld spray attachment.

However, the screw connection provided between the spray attachment handle and hose line in the case of the previously known handheld spray attachments does not readily permit rotation of the handheld spray attachment with respect to the longitudinal axis of the hose line because the screw connection between the handheld spray attachment and the hose line may otherwise become unintentionally loose and untight. The previously known handheld spray attachments generally also exhibit wear in the vicinity of the clamping or coupling point with respect to the spray attachment handle due to bending overload transversely with respect to the longitudinal axis, said bending overload being caused by the movement of the handheld spray attachment during use.

FIG. 7 of WO 2004/007854 A1 illustrates a water outlet fitting with a fitting body to which a handheld spray attachment can be releasably fastened. For this purpose, the fitting body has an outlet pipe which is curved over a sink and at which the handheld spray attachment is releasably retained. The handheld spray attachment is connected to the water inlet via a flexible hose line which is guided displaceably in the retaining pipe in such a manner that the handheld spray attachment can be released from a use position located on the retaining pipe and can subsequently be freely used. A coupling which has a ball-and-socket joint is provided between the handheld spray attachment and the flexible hose line. In this case, a ball which is connected to the hose is mounted movably in a joint socket which is provided at that end of the handheld spray attachment which faces away from the spray attachment head. The joint socket is arranged in a screw sleeve which can be screwed by an internal thread provided on the sleeve inner circumference into an external thread on the handheld spray attachment. However, because of the rotational movement exerted on the ball-and-socket joint, there is the risk of the screw sleeve becoming released and therefore also the ball-and-socket joint becoming loosened.

A water outlet fitting with a handleable water outlet is previously known from DE 20 2006 010 072 U1. The water outlet is connectable to a flexible hose line via a coupling which has a ball-and-socket joint. The ball-and-socket joint has a first and a second joint part, which joint parts are connected to each other in an articulated manner. Whereas the one joint part bears a hose nipple, the other joint part is provided with an internal or external thread which is screwable to a corresponding external or internal thread on the water outlet. The first joint part has a spherical front end region. A matching joint socket is provided on the second joint part. The first and second joint parts are spaced apart from each other in such a manner that the shell-shaped joint head of a retaining element is accommodated in the intermediate space remaining between the joint parts. This retaining element has a connecting stem which passes through a passage opening in the second joint part and is screwed by means of its free stem end to a component of the previously known water outlet fitting, which component is mounted upstream on the inflow side.

WO 2008/067 879 A1 already reveals a water outlet fitting which, at the water outlet of the fitting body thereof, has a ball-and-socket joint which has a first and a second joint part. These joint parts are connected to each other in an articulated manner and have interconnected liquid passages. In this case, the first joint part is retained pivotably by a spherical front end region of the wall thereof between a matching joint socket on the second joint part and a joint head on a retaining element provided in an internal cavity of the first joint part. The retaining element which passes with a connecting stem, which acts on the second joint part, through a passage opening in the first joint part and engages with the aid of an external thread provided at the free stem end of the connecting stem in an internal thread on the second joint part, connects the liquid passages of the first joint part and of the second joint part to each other. The spherical front end region of the first joint part is adjoined by a sleeve-shaped subregion, into the sleeve interior of which a jet regulator is insertable, said jet regulator being intended to shape the water flowing out of the outlet fitting to form a homogeneous, non-spraying and optionally also gently bubbling water jet.

Water outlet fittings with couplings which have a ball-and-socket joint in the region of a handheld spray attachment and a flexible hose line are also previously known from WO 2007/090 311 A2. However, a screw connection which contains the abovementioned disadvantages is also provided in said couplings which have a ball-and-socket joint.

SUMMARY

It is therefore in particular the object to provide a water outlet fitting of the type mentioned at the beginning which is distinguished by relatively great moveability and in particular also by rotatability between the water outlet and hose line without there being the risk by means of said rotatability that the ball-and-socket joint will become loose over time.

This object is achieved according to the invention in the water outlet fitting of the type mentioned at the beginning with the features of the invention.

The water outlet fitting according to the invention has a coupling which connects the water outlet, which is handleable flexibly by means of the hose line, to the hose line. This coupling intended for connecting the water outlet and hose line has a ball-and-socket joint. The ball-and-socket joint connected between the water outlet and hose line not only increases the moveability and articulation capability between the water outlet and the flexible hose line, but also the balland-socket joint also permits rotation of the water outlet relative to the longitudinal axis of the hose line without there needing to be any concern that the screw connection or similar coupling provided between the water outlet and hose line will become detached.

The coupling of the water outlet fitting according to the invention, which coupling is provided for connecting the water outlet and hose line, has a ball-and-socket joint which has a first and a second joint part, which joint parts are connected to each other in an articulated manner and have interconnected liquid passages, wherein one of the joint parts bears a hose nipple and an internal or external thread for the fitting to the handleable water outlet is provided on the other joint part. In this case, the first joint part is retained pivotably by a spherical front end region of the wall thereof between a mating joint socket on the second joint part and a joint head on a retaining element provided in an internal cavity of the first joint part. The retaining element passes with a connecting stem, which acts on the second joint part, through a passage opening in the first joint part and connects the liquid passages of the first joint part and of the second joint part to each other. In this case, the retaining element is connectable to the second joint part via a latching connection. Since, in the case of the water outlet fitting according to the invention, the retaining element is connectable to the second joint part via a latching connection, the components of the ball-and-socket joint integrated into the coupling provided between the water outlet and hose line can be fitted in a simple manner. In the case of the water outlet fitting according to the invention, the retaining element and second joint part merely have to be plugged one into the other in order to fit the ball-and-socket joint which is integrated into the coupling. By simply plugging together and pushing together the retaining element and second joint part axially, the ball-and-socket joint which is integrated into the coupling can be rapidly fitted in a simple manner. In comparison to a screw connection, such a latching connection permits a substantially better centering of the retaining element in the second joint part, which can assist the smooth-running of the ball-and-socket joint and can permit greater component tolerances in said region. Since the latching connection manages without an in particular adhesive threaded securing, special authorizations which are required for such adhesive connections and may be prescribed for hygienic reasons, for example in the drinking water sector, can also be avoided. Additional sealing also in the region of the latching connection is not required. The latching connection manages with a simple annular seal which can be arranged and in particular clamped at the upper free end edge of the retaining element between the retaining element and second joint part.

The ball-and-socket joint provided in the coupling configured according to the invention has two joint parts which are interconnected in an articulated manner and of which a first joint part has a spherical cap-shaped or spherical segment-shaped or similar spherical front end region. In this case, the first joint part is held pivotably by the end-side front end region, which has a spherical configuration, between a matching joint socket on the second joint part and a joint head on a retaining element provided in the internal cavity of the first joint part. Since the first joint part is therefore retained securely and fixedly between the second joint part and the retaining element, and since the first joint part is not simply secured with a sealing ring, the ball-and-socket joint has a comparatively high degree of functionality, since the retaining and the sealing function are separate from each other and can each be optimized per se. It is a particular advantage of said developing embodiment that the retaining function and the rotatability are separate from each other, and therefore the water outlet can be rotated in relation to the hose line without there being any concern that a screw connection provided in the region of the coupling will be unintentionally detached. Since the first joint part, which can be arranged on the inflow side or the outflow side of the ball-and-socket joint, is arranged so as to be able to pivot into a joint socket of the second joint part, the first joint part and second joint part can be connected to each other without relatively large transitions and in particular without aesthetically annoying jumps in diameter. In this case, the retaining element passes with a connecting shaft, which acts on the second joint part, through a plug-through opening in the first joint part, wherein the retaining element connects the liquid passages of the first joint part and of the second joint part to each other.

In order to be able to integrate the ball-and-socket joint in as space-saving a manner as possible into the coupling provided between the water outlet and the hose line, it is advantageous if the one and preferably the first joint part has a coupling opening which is on the outflow side and has an internal thread into which an external thread provided on the water outlet is screwable.

In this case, in a preferred embodiment according to the invention, the spherical front end region of the first joint part is adjoined by a sleeve-shaped subregion which, in the sleeve interior thereof which is open on the end side, bears the internal thread.

It is expedient if the second joint part bears the hose nipple.

In the case of the latching connection used according to the invention, it may be advantageous if the retaining element has, on the outer circumferential side, an annular groove in which an inwardly springable split ring or securing ring is provided, said split ring or securing ring, in the state thereof in which it is sprung out into the use position of the plug-in and/or latching connection, protruding into a securing groove on the inner circumference of the second joint part.

In order to be able readily to provide a seal in the region between the joint parts, it is expedient if at least one annular seal is provided, which annular seal is effective between the first and the second joint part or between the retaining element and the first joint part.

It may be expedient if an annular groove for receiving an annular seal is provided on the outer circumference of the retaining element, on the inner or outer circumference of the first joint part and/or on the inner circumference of the second joint part in the region of the joint socket.

In a use example, the water outlet fitting also comprises an outlet fitting with an outlet pipe, in which outlet pipe the hose line, which is connected to the water outlet, is guided preferably so as to be extendable counter to a restoring force.

In this case, it is particularly advantageous if the water outlet is retained in a standby position on the outlet pipe in such a manner that the coupling between the water outlet and hose line is arranged in the interior of the outlet pipe.

BRIEF DESCRIPTION OF THE DRAWINGS

Developments according to the invention emerge from the description in conjunction with the drawing and the claims. The invention is described in more detail below with reference to an advantageous exemplary embodiment.

In the drawing.

DETAILED DESCRIPTION OF THE PREFERRED EMBODIMENTS

Figure 1:
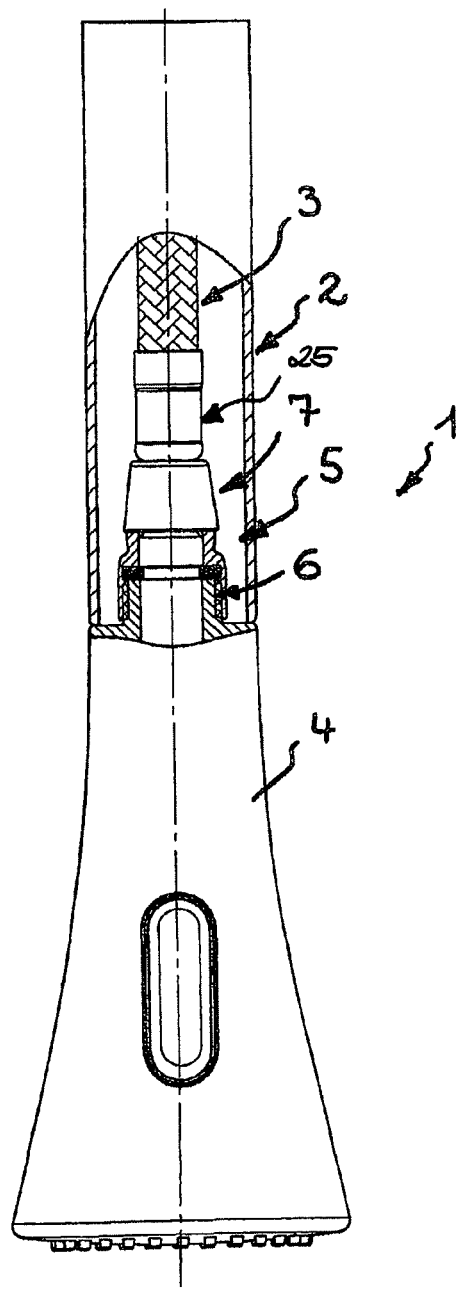
FIG. 1 shows a kitchen spray attachment fitting which is partially broken open and on which a water outlet, which is configured as a handheld spray attachment, is held by means of a pull-down extension and is connected via a flexible hose line to the water mains, wherein the water outlet which is designed as a handheld spray attachment and the flexible hose line connected thereto form a water outlet fitting.

FIG. 1 illustrates a kitchen spray attachment fitting 1 which has an outlet pipe 2. A flexible hose line 3 is guided in the outlet pipe 2 so as to be extendable counter to a restoring force and is connected at its outflow end to a water outlet 4. The water outlet 4, which is handleable flexibly by means of the hose line 3, is designed here as a handheld spray attachment. In order to connect the hose line end to the water outlet 4, a coupling 5 is provided. The water outlet 4, which is designed here as a handheld spray attachment, and the hose line 3, which is connected to the water outlet 4 via the coupling 5, are parts of a water outlet fitting.

It is clear from FIG. 1 that the coupling 5 which is provided for connecting the water outlet 4 and hose connection 3 has here a hose connection with an external thread 6, which external thread 6 is releasably connectable to a hose connection counterpart of the hose line 3. In this case, the hose connection counterpart which is illustrated in more detail in a partial longitudinal section in FIG. 2 has a ball-and-socket joint 7. The ball-and-socket joint 7 has a first and a second joint part 8, 9, which joint parts are connected to each other in an articulated manner and have interconnected liquid passages, while the second joint part 9, at the front end thereof which faces away from the first joint part 8, bears a hose nipple 10, the first joint part 8 has a sleeve-shaped subregion which, in the sleeve interior thereof which is open on the end side, bears the internal thread 11. The external thread 6 which is provided on the water outlet 4 can be screwed releasably into the internal thread 11 of the first joint part 8. In this case, that end edge of the water outlet 4 which faces the joint part 8 acts upon a sealing ring 24 in the sleeve interior of the joint part 8 in a manner providing an axial seal.

That hose end of the hose line 3 which faces the coupling 5 is pushed onto the nipple 10 and is held securely and fixedly there by means of a squeezable sleeve 25.

Figure 2:
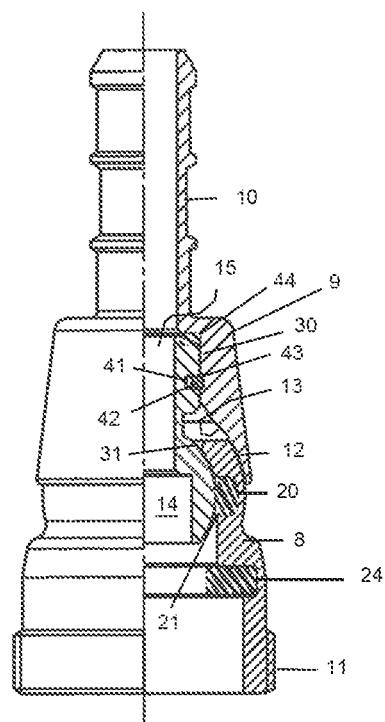
FIG. 2 shows, in a partial longitudinal section, a hose connection counterpart of the water outlet fitting shown in FIG. 1.
Figure 3:
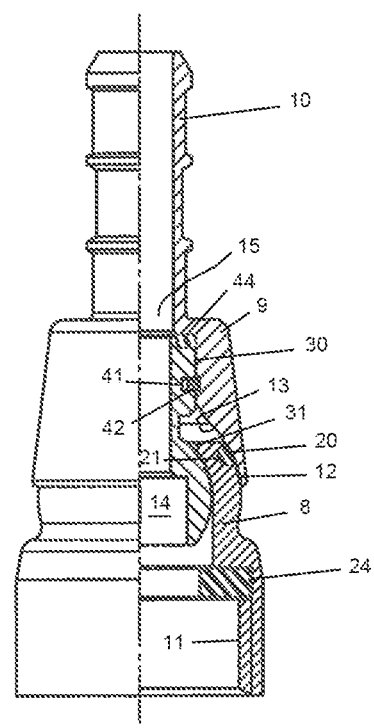
FIG. 3 shows, in a partial longitudinal section, an alternate embodiment of the of the hose connection counterpart shown in FIG. 2.

It can be seen from FIG. 2 that the first joint part 8 is retained pivotably by a spherical cap-shaped or spherical segment-shaped or similar spherical front end region 12 of the wall thereof between a matching joint socket 13 on the second joint part 9 and a joint head 14 on a retaining element 15 provided in the internal cavity of the first joint part 8. The retaining element 15 passes with a connecting stem 30, which acts on the second joint part 9, through a plug-through opening 31 in the first joint part 8 and connects the liquid passages of the first joint part 8 and of the second joint part 9 to each other.

The spherical front end region 12 of the first joint part 8 is adjoined on the outflow side by the sleeve-shaped subregion which, in the sleeve interior thereof, bears the internal thread 11.

In the exemplary embodiment shown in FIG. 2, the retaining element 15 is connectable to the second joint part 9 to the second joint part 9 via a plug-in and latching connection. The retaining element 15 has, on the outer circumferential side, an annular groove 41 which is preferably provided in the region of the connecting stem 30, in which annular groove 41 an inwardly springable split ring or securing ring 42 is provided, said split ring or securing ring protruding in the state thereof in which it has sprung out into the use position of the plug-in and latching connection into a securing groove 43 on the inner circumference of the second joint part 9. It can readily be seen in FIG. 2 that a sealing ring 44 which in particular provides an axial seal is clamped between the free front end of the retaining element 15 and the second joint part 9. The plug-in and latching connection of the exemplary embodiment shown in FIG. 2 permits rapid and simple installation of the retaining element 15 in the second joint part 9, since said components of the coupling 5 need only be plugged together and pressed together axially. In comparison to a screw connection, the plug-in and latching connection illustrated in FIG. 2 is distinguished by better centering of the retaining element 15 in the second joint part 9, this being necessary for the smooth running of the coupling 5 and permitting greater component tolerances. Since the annular groove required for accommodating a sealing ring can be dispensed with and since, instead, and since merely the sealing ring 44, which provides an axial seal, is clamped between the retaining element 15 and joint part 9, the simple production and installation of the coupling 5 is additionally assisted.

It can readily be seen in FIG. 2 that at least one annular seal 20 is provided between the retaining element 15 and the first joint part 8. Said annular seal 20 is effective between the first joint part 8 and the retaining element 15. For this purpose, an annular groove 21 for receiving the annular seal 20 is provided on the inner circumference of the first joint part 8.

FIG. 1 illustrates the water outlet 4 in a standby position, in which the water outlet 4 is retained on the outlet pipe 2 in such a manner that the coupling 5 between the water outlet 4 and the hose line 3 is arranged completely concealed in the interior of the outlet pipe 2. Since the ball-and-socket joint 7 which is integrated into the coupling 5 not only ensures pivotability but also rotatability of the water outlet 4 relative to the longitudinal axis of the hose line 3, the water outlet 4 which is connected to the hose line 3 is distinguished by high articulation capability and rotatability without there being any concern that the screw connection provided between the water outlet 4 and hose line 3 may become unintentionally detached and without the customary hose damage in the vicinity of the handle due to movement overloads occurring.

It is a particular advantage of the exemplary embodiment illustrated in more detail in FIG. 2 that the retaining function and the rotatability are separate from each other, and therefore the water outlet 4 can be rotated in relation to the hose line 3 without having to be concerned that a screw connection provided in the region of the coupling 5 will be unintentionally released. In the case of the connection illustrated in more detail, for example, in FIG. 2, the hose connection provided at the water outlet 4 can be fixedly screwed to the first joint part 8 in order, for example, in the case of a poor sealing ring 24, nevertheless to achieve sufficient sealing without this having a disadvantageous effect on the moveability of the ball-and-socket joint 7.

It is illustrated in FIG. 2 that the joint head 14 provided on the retaining element 15 has a spherical segment-shaped or similar spherical outer contour. It is clear from FIG. 2 that the annular groove 21 intended for receiving the annular seal 20 is arranged on the inner circumference of the first joint part 8 in relation to the retaining element 15 approximately in the region of the equator or of the greatest outer circumference of the spherical outer contour of the joint head 14 provided on the retaining element 15 in such a manner that said annular seal 20 is exposed only to a radial load, but not to an axial load, and that the annular seal 20 is therefore subject only to small frictional forces. By means of this particular arrangement of the annular seal 20 in the exemplary embodiment shown in FIG. 2, the annular seal 20 is subject to smaller frictional forces even in the event of higher pressures and smooth-running pivotability of the first joint part 8 in relation to the second joint part 9 and to the retaining element 15 is ensured virtually independently of the pressure. Since the groove arranged in the region of the equator can be incorporated virtually rectangularly into the inner circumference of the first joint part 8, said groove 21 can be produced and measured in a simpler manner. It is clear from FIG. 2 that, in the exemplary embodiment shown in FIG. 2, the retaining element 15 is of longer design and the frictional and contact surface of the first joint part 8 on the retaining element 15 and on the second joint part 9 can be of correspondingly larger configuration; since the annular seal 20 is arranged in the region of the equator or of the greatest outer circumference of the spherical outer contour of the joint head 14 provided on the retaining element 15, the annular seal 20 is only now loaded in the radial direction, with the result that the wear of the annular seal 20 can thereby be reduced.

The invention claimed is:

1. A water outlet fitting comprising:
a manipulable water outlet and
a flexible hose line which is connected to the water outlet via a coupling which has a ball-and-socket joint, which has a first and a second joint part,
said joint parts are connected to each other in an articulated manner and have interconnected liquid passages and of which one of the joint parts bears a hose nipple and an internal or external thread is provided on the other of the joint parts, said internal or external thread being screwable to an internal or external thread on the water outlet,
the first joint part is retained pivotably by a spherical front end region of a wall thereof between a matching joint socket on the second joint part and a joint head on a retaining element provided in an internal cavity of the first joint part,
the retaining element, having a connecting stem, which engages the second joint part, extends through a passage opening in the first joint part and connects the liquid passages of the first joint part and of the second joint part to each other, and
the retaining element is connected to the second joint part via a latching connection wherein the retaining element has, on an outer circumferential side, an annular groove in which an inwardly springable split ring or securing ring is provided, said split ring or securing ring, in a state thereof in which it is sprung out into a use position of the latching connection, protruding into a securing groove on an inner circumference of the second joint part.

2. The water outlet fitting as claimed in claim 1, wherein one of the joint parts has a coupling opening which is on an outflow side and has the internal thread.

3. The water outlet fitting as claimed in claim 2, wherein the spherical front end region of the first joint part adjoins a sleeve-shaped subregion which, in a sleeve interior thereof which is open on an end side, bears the internal thread.

4. The water outlet fitting as claimed in claim 3, wherein the second joint part bears the hose nipple.

5. The water outlet fitting as claimed in claim 1, wherein at least one annular seal is provided, said annular seal is arranged between the first and the second joint part or between the retaining element and the first joint part.

6. The water outlet fitting as claimed in claim 5, wherein an annular groove is provided, in which the annular seal is accommodated on an outer circumference of the retaining element, on an inner circumference of the first joint part in a region of the joint socket.

7. The water outlet fitting as claimed in claim 6, wherein a sealing ring is provided between a free front end of the retaining element and the second joint part.

8. The water outlet fitting as claimed in claim 7, wherein the joint head of the retaining element has a spherical outer contour, and the annular groove provided on the inner circumference of the first joint part is arranged relative to each other on the retaining element or on the first joint part at least approximately in a region of an equator or of a largest outer circumference of the spherical outer contour of the joint head.

* * * * *